United States Patent [19]

Sadaoka et al.

[11] Patent Number: 4,988,476

[45] Date of Patent: Jan. 29, 1991

[54] METHOD OF AND APPARATUS FOR EVALUATING DEFORMATION OF CHANNEL BOX OF FUEL ASSEMBLY FOR USE IN NUCLEAR REACTOR

[75] Inventors: Noriyuki Sadaoka; Hiroki Kumahora, both of Hitachi; Kazuyoshi Miki, Katsuta, all of Japan

[73] Assignee: Hitachi, Ltd., Tokyo, Japan

[21] Appl. No.: 404,344

[22] Filed: Sep. 7, 1989

[30] Foreign Application Priority Data

Sep. 9, 1988 [JP] Japan .................................. 63-224435

[51] Int. Cl.$^5$ ............................................. G21C 17/00
[52] U.S. Cl. ..................................... 376/245; 376/258
[58] Field of Search ............... 376/216, 217, 245, 258, 376/259, 463

[56] References Cited

U.S. PATENT DOCUMENTS

| | | | |
|---|---|---|---|
| 4,197,652 | 4/1980 | Qurnell et al. ........................ | 376/245 |
| 4,274,205 | 6/1981 | Starr et al. ........................... | 376/245 |
| 4,766,374 | 8/1988 | Glass, III et al. ..................... | 376/249 |
| 4,871,510 | 10/1989 | Aoyama et al. ....................... | 376/444 |

FOREIGN PATENT DOCUMENTS

| | | | |
|---|---|---|---|
| 224595 | 12/1984 | Japan .................................... | 376/245 |
| 164152 | 7/1986 | Japan .................................... | 376/245 |
| 228985 | 10/1987 | Japan .................................... | 376/245 |
| 25795 | 1/1990 | Japan .................................... | 376/245 |

Primary Examiner—Daniel D. Wasil
Attorney, Agent, or Firm—Antonelli, Terry, Stout & Kraus

[57] ABSTRACT

Evaluation for deformations of the channel box of a fuel assembly in a nuclear reactor core in which deformations of the channel box which has been used for exposure so as to be deformed are estimated for future exposure through computation and process of data of core characteristics, data of material properties and shapes of channel boxes, data of initial deformations of the channel box, data of loading patterns and the like, thereby to judge whether the estimated deformations are agreeable for reusing the channel box in the future exposure, or not.

10 Claims, 24 Drawing Sheets

FIG. 2

| DATA OF CORE CHARACTERISTIC | |
|---|---|
| DATA ITEM | INPUT EXAMPLE |
| NAME OF CORE | 2F-2 |
| TYPE OF CORE | BWR-5 |
| SHAPE OF CORE | — |
| NUMBER OF OPERATING CYCLES (N) | 9 |
| NUMBER OF OPERATING DAYS FOR EACH CYCLE | DAY(N) |
| FIRST NEUTRON FLUX IN ENTIRE CORE | Fav |
| DISTRIBUTION OF AXIAL PRESSURE LOSS | FAST(I,J,K) |
| THREE-DIMENTIONAL DISTRIBUTION OF FAST NEUTRON FLUX | P(K) |

FIG. 3

| DATA OF MEASURED DEFORMATIONS | |
|---|---|
| DATA ITEM | INPUT EXAMPLE |
| LABEL NAME OF FUEL ASSEMBLY (FOR N ASSEMBLIES) | LABEL(N) |
| LABEL NAME OF CHANNEL BOX | FCB(N) |
| HEIGHT POSITION OF DEFORMATION MEASURING POINT (POINT K) | HIGHT(K) |
| EXPOSURE | EXP(N) |
| MEASURED VALUE OF BULGE (AXIAL POINT K) | BULGE(K) |
| MEASURED VALUE OF BEND (AXIAL POINT K) | BOW(K) |

FIG. 4

| DATA OF SET LOADING PATTERN | |
|---|---|
| DATA ITEM | INPUT EXAMPLE |
| MAP OF FUEL ASSEMBLY LABELS | LABEL(I, J, N) |
| MAP OF CHANNEL BOX LABELS | FCB(I, J, N) |
| MAP OF ORIFICE TYPE LABELS | OPIF(I, J, N) |
| MAP OF FUEL ASSEMBLY TYPE LABELS | IAT(I, J, N) |
| CHANNEL TYPE | FCBP(I, J, N) |
| MAP OF CYCLES OF CHANNELS IN USE | ICYCL(I, J, N) |
| | |

FIG. 5

| DATA OF MATERIAL PROPERTIES AND SHAPES | |
|---|---|
| DATA ITEM | INPUT EXAMPLE |
| YOUNG'S MODULUS | Y |
| POISSON'S RATIO | $\nu$ |
| FLEXURAL RIGIDITY | D |
| CONSTANT OF CREEP RATE | EPS1, EPS2 |
| HEIGHT OF CHANNEL BOX | HIGIT |
| WIDTH OF CHANNEL BOX | WIDTH |
| THICKNESS OF CHANNEL BOX | THICK |
| GAP WIDTH | GAP |
| THICKNESS OF CONTROL ROD | CDW |

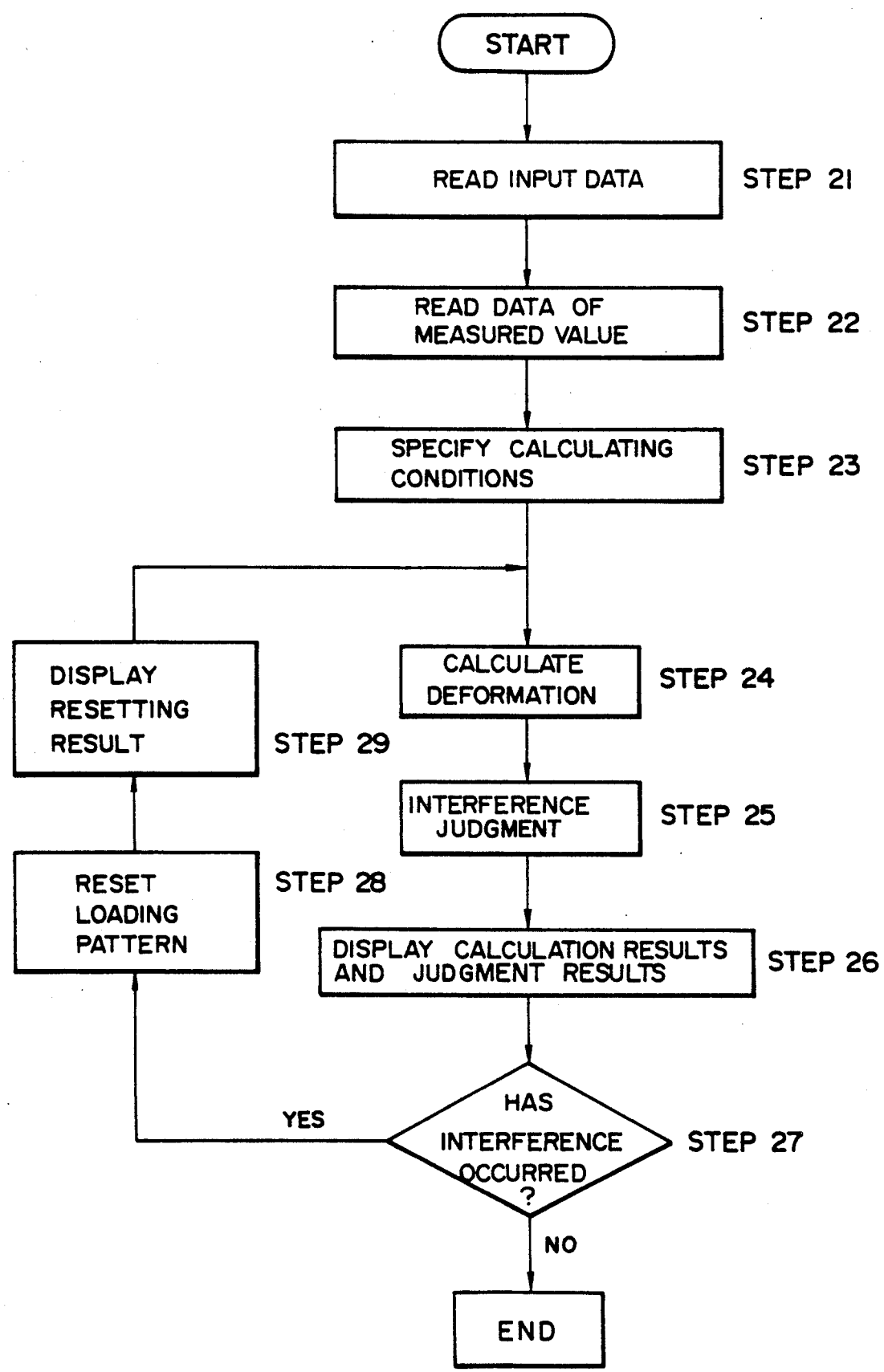

DATA OF MATERIAL PROPERTIES AND SHAPES OF CHANNEL BOX 11

1. MATERIAL-PROPERTY DATA
   - YOUNG'S MODULES    $E = 8267.33$ (kgf/mm$^2$)
   - POISSON'S RATIO    $\nu = 0.3544$ (−)
   - FLEXURAL RIGIDITY  $DF = 1.291 \times 10^4$ (kgf/mm$^2$)
   - CONSTANT OF CREEP RATE    EPS1 = 3.1187
       EPS2 = 0.00354

2. CHANNEL-BOX-SHAPE DATA
   - WEIGHT    $H = 3750.0$ (mm)
   - WIDTH     $W = 136.0$ (mm)
   - THICKNESS $T = 2.54$ (mm)
   - GAP       $G = 3.60$ (mm)

FIG. 14

IDENTIFICATION NUMBER OF CHANNEL BOX   ID = 413
3RD-CYCLE IN-CORE LOADING POSITION   (I,J); CORE POSITION COORDINATES
N; CYCLE NUMBER (I, J, N) = (11, 9, 3)

| AXIAL POSITION | CHANNEL SIDE; SIDE P-R | | | CHANNEL SIDE; SIDE Q-S | | | INTER-FERENCE JUDGMENT |
|---|---|---|---|---|---|---|---|
| | BULGE | BOW | TOTAL | BULGE | BOW | TOTAL | |
| 1 | 0.7 | +0.4 | 1.1 | 0.6 | -0.2 | 0.8 | O |
| 2 | 1.1 | +0.6 | 1.7 | 0.8 | -0.4 | 1.2 | O |
| 3 | 1.4 | +0.8 | 2.2 | 1.2 | -0.6 | 1.8 | O |
| 4 | 1.5 | +0.9 | 2.4 | 1.4 | -0.8 | 2.2 | O |
| 5 | 1.8 | +1.1 | 2.9 | 1.7 | -1.0 | 2.7 | O |
| 6 | 2.0 | +1.3 | 3.3 | 1.9 | -1.1 | 3.0 | O |
| 7 | 2.1 | +1.5 | 3.6 | 2.1 | -1.3 | 3.4 | O |
| 8 | 2.6 | +1.2 | 3.8 | 2.5 | -1.2 | 3.7 | O |
| 9 | 2.9 | +1.0 | 3.9 | 2.8 | -0.9 | 3.7 | X |
| 10 | 3.2 | +0.8 | 4.0 | 3.0 | -0.7 | 3.7 | X |
| 11 | 3.1 | +0.3 | 3.4 | 2.9 | -0.6 | 3.5 | O |
| 12 | 2.8 | +0.1 | 2.9 | 2.7 | -0.3 | 3.0 | O |
| | 3.2 | +1.5 | 4.0 | 3.0 | -1.3 | 3.7 | |

(UNIT: mm)

FIG. 16

DISTRIBUTION OF DEFORMATIONS OF CHANNEL BOXES IN CORE

SET CORE REGION; 1/4 CORE

TARGET CORE; A, 7TH CYCLE

| CORE POSITION | | ASSEMBLY NUMBER | EXPOSURE CYCLE | MAXIMUM DEFORMATION (mm) | | | AXIAL POSITION |
|---|---|---|---|---|---|---|---|
| I | J | | | BULGE | BOW | TOTAL | |
| 1 | 7 | 630 | 5 | 2.7 | 1.2 | 3.9 | 8 |
| 1 | 8 | 649 | 5 | 2.4 | 0.7 | 3.1 | 8 |
| 1 | 9 | 503 | 4 | 1.8 | 1.1 | 2.9 | 9 |
| 1 | 10 | 458 | 3 | 1.4 | 0.7 | 2.1 | 9 |
| 1 | 11 | 419 | 3 | 1.2 | 0.6 | 1.8 | 7 |
| 2 | 6 | 805 | 7 | 3.1 | 1.8 | 4.9 | 10 |
| 2 | 7 | 499 | 3 | 1.8 | 0.3 | 2.1 | 7 |
| 2 | 8 | 316 | 2 | 0.9 | 0.2 | 1.1 | 8 |
| 2 | 9 | 388 | 2 | 0.6 | 0.2 | 0.8 | 9 |
| 2 | 10 | 317 | 2 | 1.1 | 0.1 | 1.2 | 8 |
| 2 | 11 | 383 | 2 | 1.0 | 0.2 | 1.2 | 8 |
| 3 | 5 | 837 | 7 | 2.9 | 2.3 | 5.2 | 7 |

FIG. 18

POSITION OF OCCURRENCE OF INTERFERENCE BETWEEN CONTROL ROD AND CHANNEL BOX

TARGET CORE ; A , 6TH CYCLE

NUMBER OF POSITIONS AT WHICH INTERFERENCE HAS OCCURRED ; FIVE

| CHANNEL NUMBER AT WHICH INTERFERENCE HAS OCCURRED | | IN-CORE LOADING POSITION OF CHANNEL WHICH HAS CAUSED INTERFERENCE | | NUMBER OF EXPOSURE CYCLES | |
|---|---|---|---|---|---|
| 1 | 2 | 1 | 2 | 1 | 2 |
| 831 | 909 | (1,6) | (1,7) | 5 | 6 |
| 837 | 630 | (2,5) | (2,6) | 5 | 3 |
| 830 | 945 | (1,7) | (1,8) | 5 | 6 |
| 649 | 611 | (1,11) | (2,11) | 3 | 3 |
| 757 | 420 | (9,10) | (9,11) | 1 | 3 |
| | | | | | |
| | | | | | |
| | | | | | |
| | | | | | |
| | | | | | |

FIG. 21

RULE OF RESETTING OF LOADING PATTERNS

SELECT RULE NO. → (1), (3), (4)

| NO. | RULE |
|---|---|
| 1. | CHANNEL BOXES WHICH HAVE CAUSED INTERFERENCE ARE MOVED TO THE POSITIONS OF INTERCHANGEABLE ASSEMBLIES WHICH HAVE BEEN USED FOR EXPOSURE IN THE SAME EXPOSURE CYCLE |
| 2. | TWO SIDE SURFACES WHICH OPPOSE AN ASSOCIATED CONTROL ROD ARE NOT ALTERED IN POSITION IN EACH CELL |
| 3. | A CHANNEL BOX IS MOVED TO A POSITION IN THE CORE AND A POSITION IN A CELL SO THAT A SIDE SURFACE, WHICH BOW IN A PROTRUSIVE MANNER FROM THE FIRST CYCLE THROUGH AN (n-1)TH CYCLE WHICH PRECEDED AN nTH CYCLE IN WHICH INTERFERENCE OCCURRED, IS MADE TO FACE OUTWARDLY OF THE CORE IN THE nTH CYCLE |
|  |  |

METHOD OF AND APPARATUS FOR EVALUATING DEFORMATION OF CHANNEL BOX OF FUEL ASSEMBLY FOR USE IN NUCLEAR REACTOR

BACKGROUND OF THE INVENTION

1. FIELD OF THE INVENTION

The present invention relates generally to a method of evaluating deformations of channel boxes of fuel assemblies for use in nuclear reactors and, more particularly, to a method of evaluating deformations of the channel boxes in a single exposure cycle period of a nuclear reactor. The present invention also relates to an apparatus for evaluating deformations of channel boxes of fuel assemblies for use in nuclear reactors.

2. DESCRIPTION OF THE RELATED ART

In general, fuel assemblies for use in BWR's (boiling-water type light water reactors) have a structure in which a fuel bundle including sixty-two fuel rods and two water rods is accommodated in a channel box made of zircalloy-4, the fuel rods and the water rods being arrayed in an 8×8 grid-like configuration and being retained by means of upper and lower tie-plates and spacers.

A multiplicity of fuel assemblies which are constructed in the above-described manner are arrayed as shown in FIG. 19 in a nuclear core. The number of fuel assemblies in the core is on the order of 400 to 764, although it depends upon the required power of each nuclear reactor.

In the core, the fuel assemblies are combined in groups each consisting of four fuel assemblies, and a cross-shape control rod is inserted into a cross-shaped gap which is formed by the adjacent corner portions of the four fuel assemblies in the middle of each group. Each fuel assembly in the core is provided with an identification number and core-array position coordinates (i, j) for identification purposes.

Deformations of the channel boxes of the aforesaid fuel assemblies in an exposure cycle period of the nuclear reactor are explained with reference to Figs. 23a and 23b.

FIGS. 23a and 23b are views which serve to illustrate the status of deformation of a particular channel box which has been used for exposure in a core. FIG. 24 is a cross-sectional view showing a single cell unit consisting of four fuel-assembly channel boxes and a cross-shaped control rod.

When BWR fuel assemblies are loaded in a reactor, a small amount of reactor coolant flows not only in a primary flow passage in each channel box but in gaps between the fuel assemblies, and a differential pressure $\Delta P$ occurs between the inside and the outside of the channel box. The channel box is deformed by cree due to this differential pressure $\Delta P$ and reactor-water temperatures (280–300° C.) and bulges in the radial direction as shown in FIG. 23a. The amount of bulge also depends on fast neutron flux $\phi$ since the rate of creep of zircalloy under exposure conditions is accelerated compared to the rate of creep under non-exposure conditions. The differential pressure $\Delta P$ between the inside and the outside of the channel box which forms a primary cause of the bulge reaches the maximum at the lower end of the fuel assembly, while the fast neutron flux $\phi$ reaches the maximum in the middle of the core in the axial direction thereof. Accordingly, the distribution of the bulge of the channel box appears in the axial direction of the core, and becomes the largest at a position about ⅓ higher than the lower end of the fuel assembly. Moreover, the bulge of the channel box depends on the loading position thereof in a core, and the bulge increases toward the middle of the core and it is the smallest at the outermost circumferential portion of the core.

The crystal grains in zircalloy which is a typical material for channel boxes, are oriented in a certain direction during production. Accordingly, in an exposure environment, zircalloy is deformed in a particular direction even in the absence of external stress. This phenomenon is referred to as irradiation growth, which forms a cause of axial bending of the entire channel box.

The amount of irradiation growth of zircalloy greatly depends on differences in material properties and exposure conditions, particularly fast neutron flux. If a great difference occurs in the fast neutron flux between opposing side surfaces of a channel box, a difference in the amount of irradiation growth occurs between these side surfaces. As a result of the difference in the amount of irradiation growth, a channel box may be deformed in the middle portion thereof as shown in FIG. 23b since the upper and lower ends of the channel box is supported on a fuel assembly. Bowing of each channel box depends on the loading position thereof in the core. In the middle portion of the core, the degree of bowing is small since the gradient of the fast neutron flux is small. However, in the outer peripheral region of the core, since fast neutron flux of a large gradient appears between opposing side surfaces of a channel box, the degree of bowing becomes large.

If the loading period of the channel box in the reactor is increased, the aforesaid bulge and bow also increase. As a result, it is likely that the gap between the channel box and an associated control rod decreases and a control rod becomes unable to be inserted in the gap between channel boxes in each group.

The gap between each channel box and an associated control rod averages about 3 mm. The amount of deformation induced by exposure greatly depends on the loading position in the core.

Accordingly, in order to increase the loading period of channel boxes over the entire region of the core, it is necessary to examine that no interference has occurred between the channel boxes and associated control rods by estimating deformations of the individual channel boxes at the respective positions in the core.

Conventionally, estimated deformations of channel boxes during the loading period thereof in a reactor have been obtained by using empirical formulae which are based on data obtained by measurement in an actually operating reactor. However, since such empirical formulae are based on data obtained in the existing exposure range, if the loading period of the channel boxes in the reactor is made long, the degree of exposure of the channel boxes greatly exceeds the degree of exposure to which the conventional empirical formulae are applicable. Accordingly, the estimated deformations of the channel boxes which have been obtained simply by extrapolating the conventional empirical formulae are excessively rough, and it is therefore necessary to make large a design margin and a safety margin in the method of using the channel box.

Conventional channel boxes are disassembled and disposed of in a nuclear reactor site, commonly after they have been used over three or four cycles. However, the production cost of channel boxes is the next highest to that of fuel rods of all the constituent elements of fuel assemblies and, in addition, disposal of the channel boxes incurs significant costs and expenses. Moreover, as waste channel boxes are accumulated, the problem that an even wider space for safety storing the waste channel boxes must be attained will be encountered.

Japanese Pat. application No. 56-59807 proposes an arrangement in which the service life of a channel is extended by altering the wall thickness of the channel box.

However, such alternation in the wall thickness of the channel box involves the problem of design change of channel boxes, with the result that the economical efficiency and the usability of channel boxes are impaired.

SUMMARY OF THE INVENTION

It is, therefore, an object of the present invention to provide an evaluating method in which, when a channel box of a fuel assembly, which has been used over three or four exposure cycles, is to be reused, deformation of the channel box at predetermined core-array position coordinates (I, J) in a nuclear reactor core during the next exposure cycle is estimated to judge whether or not the deformation is agreeable.

It is another object of the present invention to provide an evaluating method including the steps of altering core-array position coordinates ((I, J), estimating deformation of the channel box at the core-array position coordinates, and again judging whether or not the deformation is agreeable, these steps being executed if it is judged by the above-described evaluating method that the deformation of the channel box is not agreeable.

It is yet another object of the present invention to provide an apparatus for carrying out the aforesaid evaluating methods.

To achieve the above objects, a method of evaluating deformations of channel boxes in accordance with the present invention comprises the steps of finding initial deformations of a particular channel box to be reused, specifying core-array position coordinates at which the aforesaid channel box is adapted to be located; calculating deformation of the channel box at the core-array position coordinates from data of core characteristics, data of shapes and material properties of channel boxes, data of loading patterns, and the aforesaid initial deformation; and judging whether the thus-calculated deformation is agreeable.

With the above-described construction and arrangement according to the present invention, deformation in the next exposure cycle of a channel box of a fuel assembly, which has been used throughout three or four exposure cycles, can be evaluated, whereby the possibility of reuse of the channel box can be judged. Accordingly, it is possible to efficiently use channel boxes, and economical management of a nuclear reactor core can be realized.

BRIEF DESCRIPTION OF THE DRAWINGS

FIG. 2 is a table showing the contents of data stored in the core-data memory device shown in FIG. 1;

FIG. 3 is a table showing the contents of data stored in the measured-data memory device shown in FIG. 1;

FIG. 4 is a table showing the contents of data stored in the set-loading-pattern memory device shown in FIG. 1;

FIG. 5 is a table showing the contents of data stored in the material-property-and-shape-data memory device shown in FIG. 1;

FIG. 6 is a flow chart showing a procedure carried out by using the aforesaid deformation evaluating apparatus;

FIG. 14 is a view showing a display example of deformations of a channel box;

FIG. 16 is a view showing a display example of deformations of respective channel boxes in a region corresponding to ¼ of the entire core region;

FIG. 18 is a view showing a display example in which the positions of channel boxes which have caused interference in the entire region of the core are displayed;

FIG. 21 is a view showing a set of examples of rules used in resetting loading patterns;

DESCRIPTION OF THE PREFERRED EMBODIMENTS

Embodiments of a method of and an apparatus for evaluating deformations of channel boxes in accordance with the present invention will be explained below with reference to the accompanying drawings.

Figure 1:
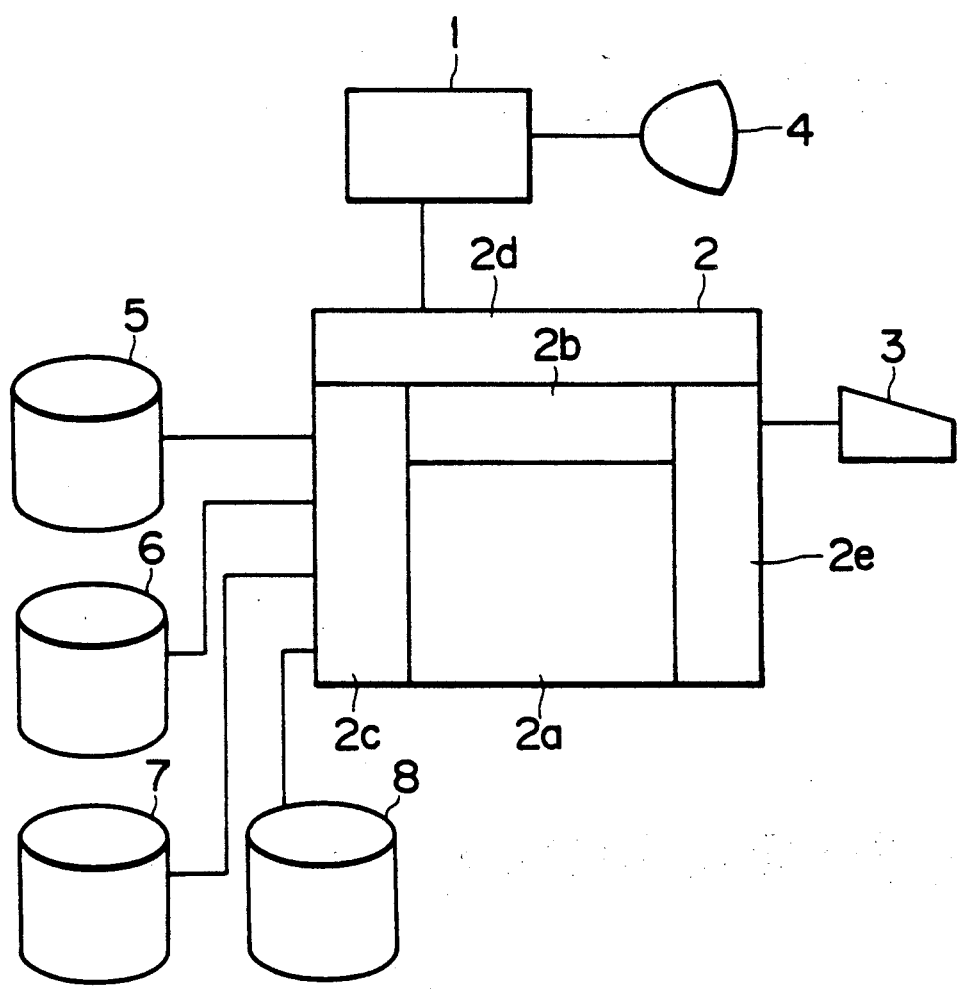
FIG. 1 is a schematic view diagrammatically showing the construction of an apparatus for evaluating deformations of channel boxes in accordance with the present invention.

As shown in FIG. 1, the present apparatus includes a display device 1 and a computing and processing device 2. The computing and processing device 2 consists of a computing section 2a, a procedure storing section 2b, an intermediate-data storing section 2c, an image-data outputting section 2d and an input section 2e. Data created by the computing and processing device 2 is displayed on a display screen of an image output device 4 in the form of a picture, characters and the like. An input device is denoted by 3.

The illustrated apparatus also includes memory devices 5, 6, 7 and 8. The memory devices 5, 6, 7 and 8 respectively store therein data of core characteristics, data of measured deformations of channel boxes, data of material properties and shapes, and data of set loading patterns.

FIGS. 2 to 5 are tables showing the contents of the data stored in the respective memory devices 5, 6, 7 and 8. The data of core characteristics, shown in FIG. 2, includes core names, core types, the three-dimensional distribution of fast neutron flux and so on. The data of measured deformations of a channel box, shown in FIG. 3, includes the name of each fuel-assembly label, the degree of exposure of each fuel assembly, and the measured values of bulge and bow. The data of set loading patterns, shown in FIG. 4, includes a map of fuel-assembly labels, a map of channel-box labels and so on for each cycle. The data of material properties and shapes, shown in FIG. 5, includes the Poisson's ratio, the flexural rigidity, the Young's modulus and the like of a channel-box material.

Figure 7:
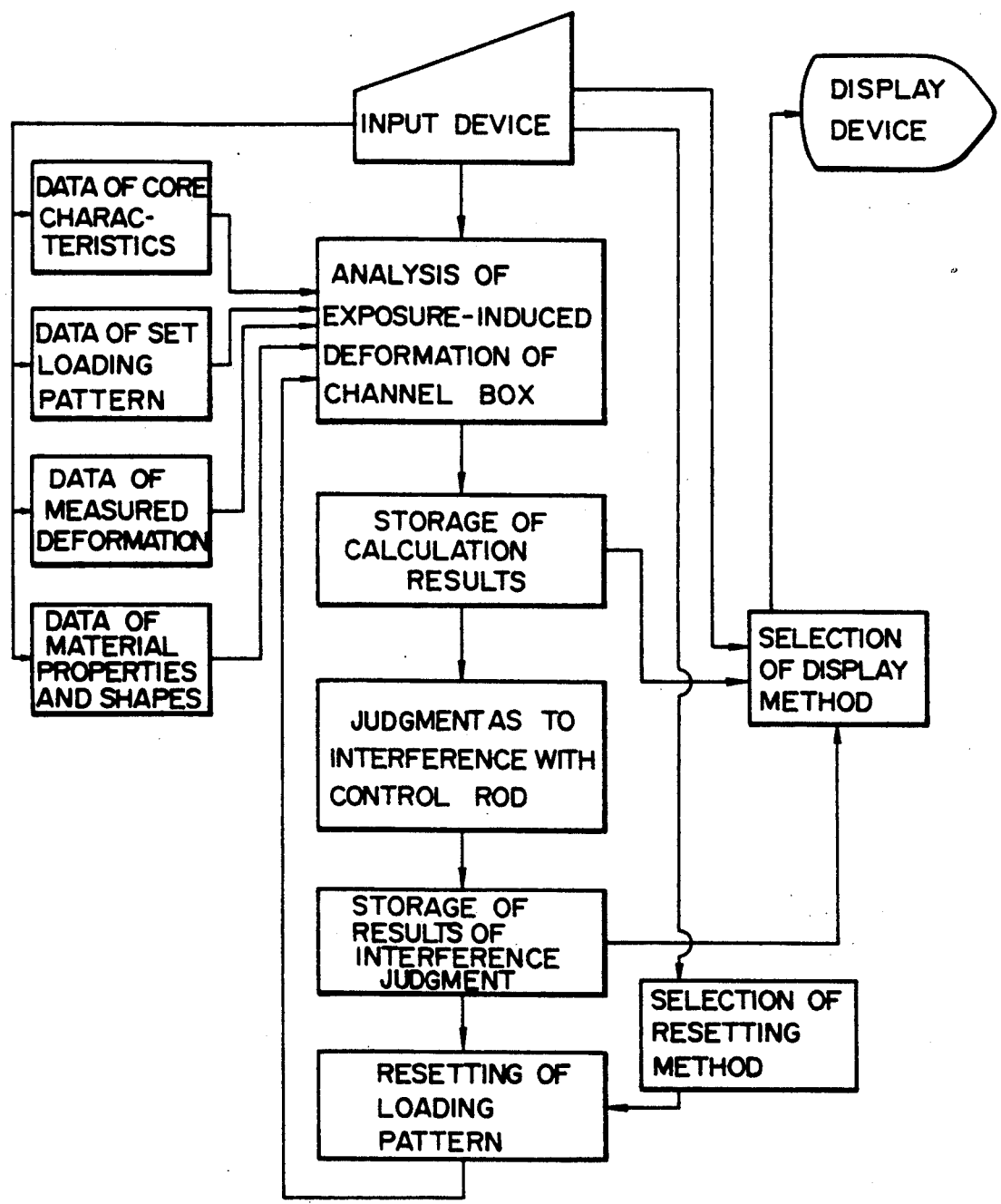
FIG. 7 is a block diagram showing the flow of operations in the deformation evaluating apparatus of FIG. 1.

FIG. 6 shows a procedure employing a method of and an apparatus for evaluating deformations of channel boxes in accordance with this embodiment o the basis of the above-described data. FIG. 7 is a block diagram which functionally represents this procedure. FIGS. 8 to 11 show in detail the procedures of individual portions of the procedure shown in FIG. 6. The procedure for evaluating deformations of channel boxes in accordance with this embodiment will be explained in sequence.

Figure 12:
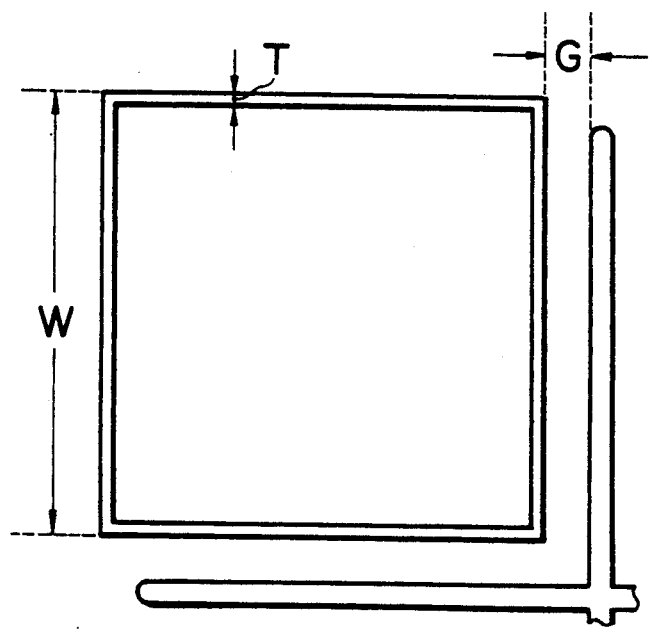
FIG. 12 is a view showing a display example of data of the material properties and shapes of a channel box.
Figure 13:
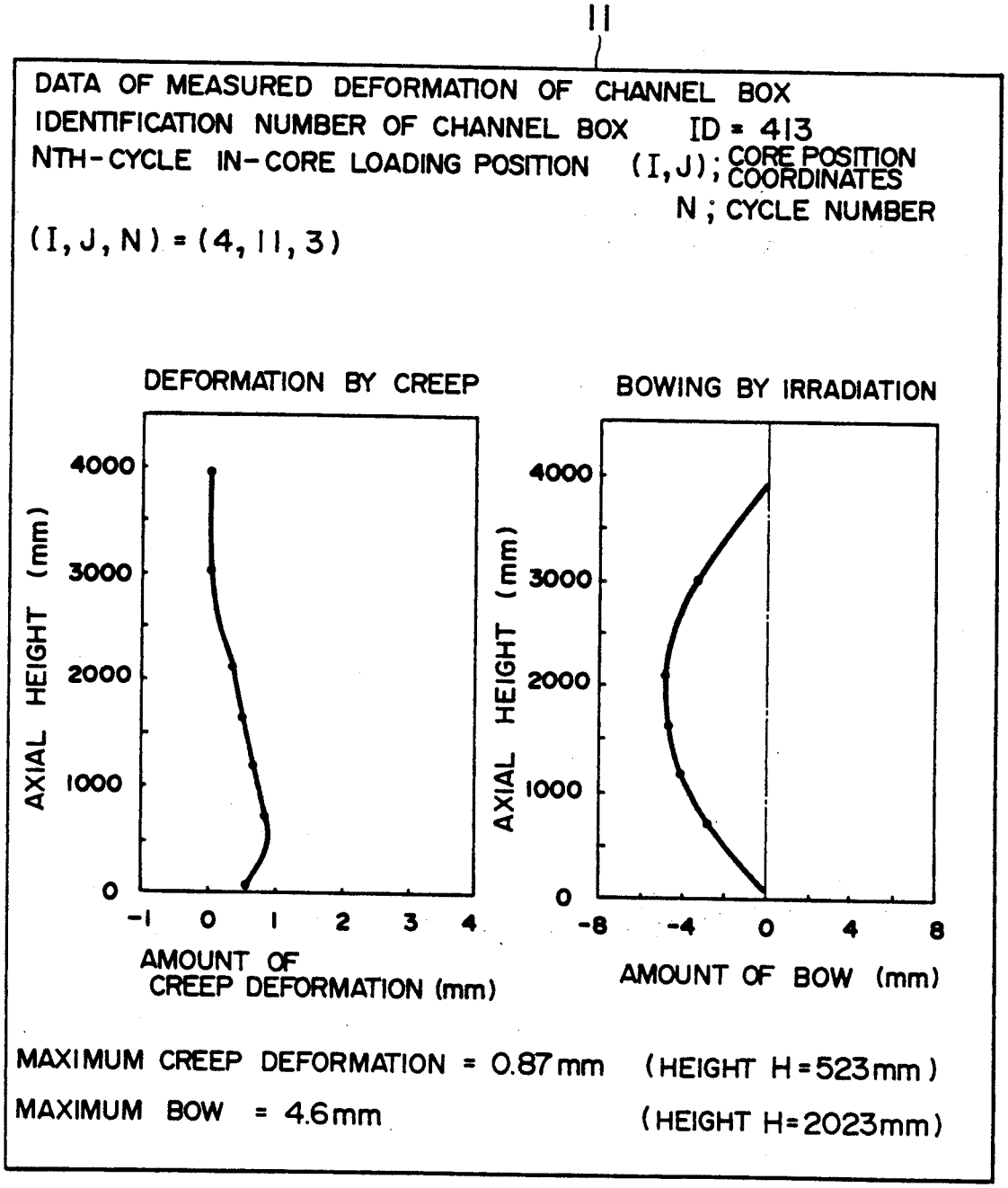
FIG. 13 is a view showing a display example of data of the measured deformations of a channel box.

Referring to FIG. 1, the process first proceeds to Step 21, in which the data of core characteristics, shown in FIG. 2, is inputted through the input device 3 and stored in the memory device 5. Likewise, the data of measured deformations of a channel box, shown in FIG. 3, is stored in the memory device 6. The data of material properties and shapes, shown in FIG. 4, is stored in the memory device 7, and the data of a set loading pattern, shown in FIG. 5, is stored in the memory device 8. FIG. 12 shows an example of a display provided when the data of material properties and shapes, stored in the memory device 7, is outputted to the image output device 4. FIG. 13 shows an example of a display on the image output device 4. In this display example, a result is plotted which is obtained by axially measuring creep deformation and exposure bow which occurs in a particular channel box after the third exposure cycle, and the particular channel box is shown as being identified with a channel number 413 and core-array position coordinates (4, 11) from among all the seven hundred and sixty-four channel boxes disposed in a core.

The process of outputting the above-described data to the image output device 4 is executed in accordance with an output command which is inputted through a keyboard (not shown) provided on the input device 1.

Then, in Step 23, setting of the exposure cycle and the loading pattern for a channel box whose deformation is to be estimated is carried out. In Step 24, the process jumps to the subroutine shown in FIG. 8. In this subroutine, the estimated deformation of the channel box whose conditions were set in Step 23 is calculated for each axial position as well as for each radial position by employing the measured-deformation data and an analytic model in the computing section 2a. The results of these calculations are stored in the intermediate-data memory section 2c. The procedure for performing these calculations is explained in detail below with reference to FIG. 8.

First of all, the distribution of the fast neutron flux in the core is read from the data of core characteristics stored in the memory device 5. Moreover, the map of fuel-assembly labels and the map of channel-box labels are read from the set loading pattern stored in the memory device 8 so that the computing and processing device 2 is made to recognize the correspondence between fuel assemblies as or channel boxes and respective loading positions in the core. On the basis of the data thus read, calculations on fast neutron flux $\phi$ are performed (Step 24A). The result of a core-characteristic calculation program is employed as the fast neutron flux $\phi$. However, since the fast neutron flux $\phi$ corresponding to the midpoint of each fuel assembly in the core is already given, the fast neutron flux $\phi$ at each side surface of the channel box, in which the fuel assembly is loaded, is obtained by interpolating the fast neutron flux $\phi$ between adjacent fuel assemblies. Fast-neutron fluence FU is calculated with the following equation (Step 24B):

$$FU = \phi \cdot t \qquad (9)$$

where $\phi$ : fast neutron flux, and
t : exposure time.

Then, regarding a channel box which has been actually loaded in the nuclear reactor and extracted therefrom after exposure for the purpose of measuring its deformation, the measured value of the deformation is read from the memory device 6 (Step 24C) and the read value is used as an initial value. With respect to a channel box whose measured value is not available, an estimated value obtained by calculations is employed. Moreover, the data of material properties and shapes is read from the memory device 7.

In addition, the amount of bulge and the amount of bow are calculated in Steps 24D and 24E, respectively. Thereafter, the total sum of these deformations is obtained (Step 24F). These calculations are performed for each of the channel boxes of all the fuel assemblies loaded in the core (Step 24G). Moreover, the above calculations are performed for all the loaded fuel assemblies in each cycle having a set cycle period, for example, in each of the first to fifth cycles (Step 24H).

Figure 8:
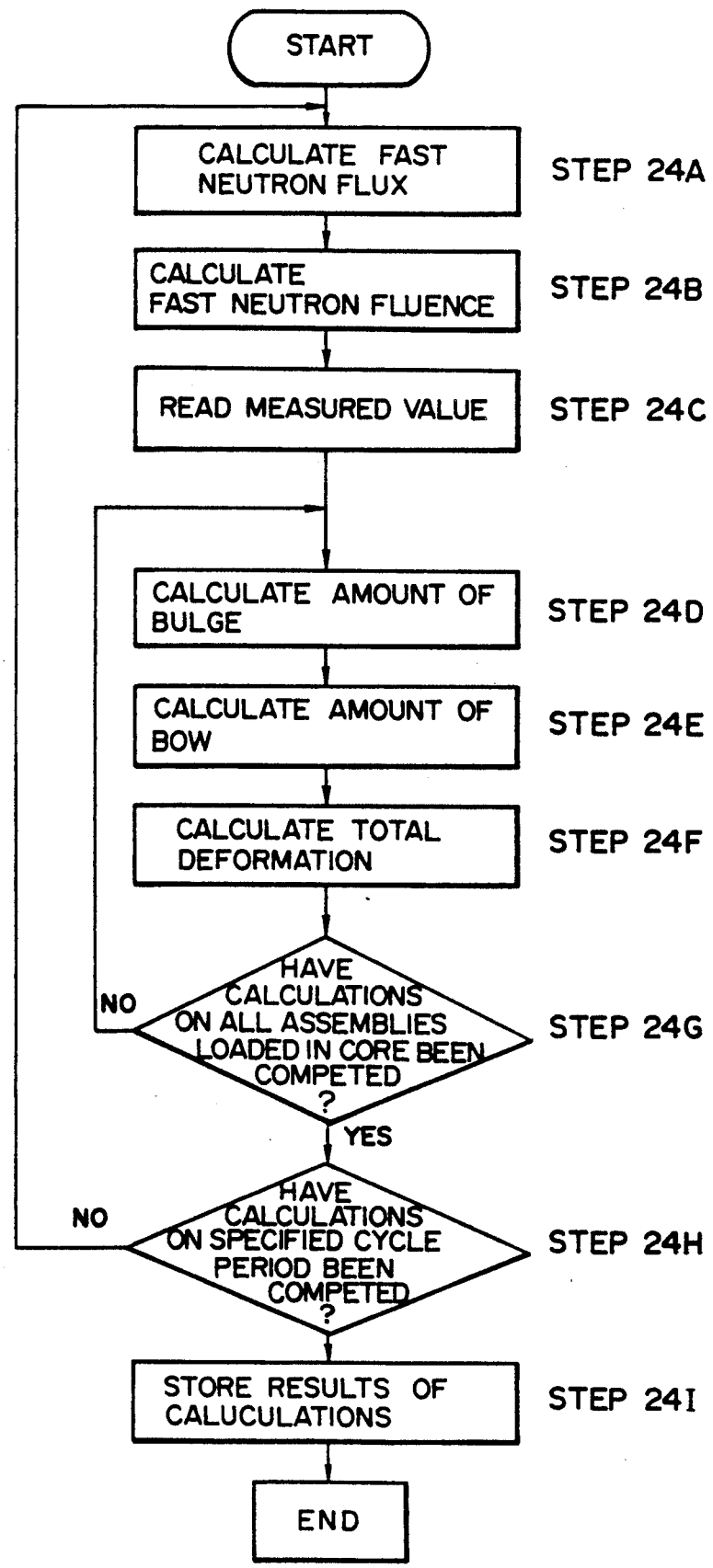
FIGS. 8 to 11 are flow charts which show the operations in the respective subroutines shown in FIG. 6.

The total deformation D(z) of the channel boxes calculated in the flow chart of FIG. 8 is given by the following equation:

$$D(z) = \delta_O + \delta + \Delta\delta + X(z)$$

$\delta_O$ : initial deformation,
$\delta$ : elastic deformation,
$\Delta\delta$ : increment of bulge, and
X(z) : displacement due to bowing.

The analysis method is explained in detail below.

The deformation of a channel box is represented by the sum of bulge and bow. The bulge at an axial position z is represented by the sum of the elastic deformation $\delta$ and the increment $\delta\Delta$ of the bulge for a time interval $\Delta't$. These amounts $\delta$ and $\Delta\delta$ are obtained from the following equations:

$$\delta = \frac{2P}{3D}\left(\frac{L}{2}\right)^4 \left(\frac{x}{L} + \frac{1}{2}\right)^2 \left(\frac{x}{L} - \frac{1}{2}\right)^2 \qquad (1)$$

$$\Delta\delta = R\epsilon\Delta t \qquad (2)$$

where
P : load resulting from differential pressure,
L : width of the channel box, and
R : radius of curvature of the bow (mm).
Flexural rigidity D and the creep rate $\epsilon$ of a zircalloy are obtained from the following equations:

$$D = \frac{Ed^3}{12(1 - v^2)} \quad (3)$$

$$\epsilon = \frac{4.05 \times 10^6}{T^7} e^{-5000/T} \phi^{0.65} \sigma \quad (5)$$

where
E : Young's modulus,
$v$ : Poisson's ratio,
d : thickness of the channel box,
T : temperature of the channel box (K),
$\phi$ : fast neutron flux (1/mm²·s) (En>1Mev), and
$\sigma$ : tensile stress.

The fast neutron flux $\phi$ in equation (4) is the one obtained by the calculations performed in Step 24A of the procedure shown in FIG. 8.

As described previously bowing results from the irradiation growth of the zircalloy. If a bending moment which is applied to a channel box due to the irradiation growth in the axial direction z of the same is represented by Mx in the x direction, displacement X(z) due to bowing in the x direction at a position z in the axial direction is obtained from the following equation based on the beam theory:

$$EI_x \frac{d^2X}{dZ^2} = Mx \quad (5)$$

where Ix : second moment of area with respect to the X axis

The bowing moment Mx and irradiation growth strain $\epsilon j$ ($\Delta H/H$) are obtained from the following equations, respectively:

$$Mx = E \cdot H \cdot \sum_{j=1}^{M} (\Delta S_j \cdot \epsilon_j \cdot x_j) \quad (6)$$

$$\epsilon_j = A \left[ \exp\left(\frac{240.8}{T_j}\right) \right] \cdot (FU_j) \quad (7)$$

where
$\Delta S_j$ : area of a finely divided region of the channel box,
H : height of the channel box,
A : constant ($=1.435 \times 10^{-13}$),
t : exposure time (S), and
$FU_j$ : fast-neutron fluence.

The fast-neutron exposure $FU_j$ in equation (7) is the one obtained by the calculations performed in Step 24B.

By solving equation (5) by employing equations (6) and (7), the displacement X(z) due to bowing is obtained. The total displacement D(z) of the channel box which is the sum of bow and bulge is obtained from the following equation:

$$D(z) = \delta_O + \delta + \Delta\delta + X(z) \quad (8)$$

A load P which is derived from a differential the fast-neutron flux $\phi$ and a temperature T is obtained by nuclear calculations and hydrothermal calculations, and is stored as data of core nuclear properties. The width L, the height H and the thickness d of the channel box as well as the Young's modulus E and the Poisson's ratio TM of the zircalloy are stored as data of material properties. As data of the measured value of initial deformation of the channel box, $\delta_0$ in equation (8) is stored.

The results of the above calculations on bulge, bow and deformation are transferred to and stored in the intermediate-data storing section 2c.

Then, on the basis of the results of the calculations on the deformation of the channel box, stored in the intermediate-data storing section 2c, the computing and processing section 2a uses the subroutine of FIG. 9 to determine whether or not interference has occurred between the channel box 9 and the control rod 12 (hereinafter referred to simply as "interference judgment" as required), the channel box 9 being a channel box in which set assemblies are loaded (step 25 in FIG. 6).

Figure 9:
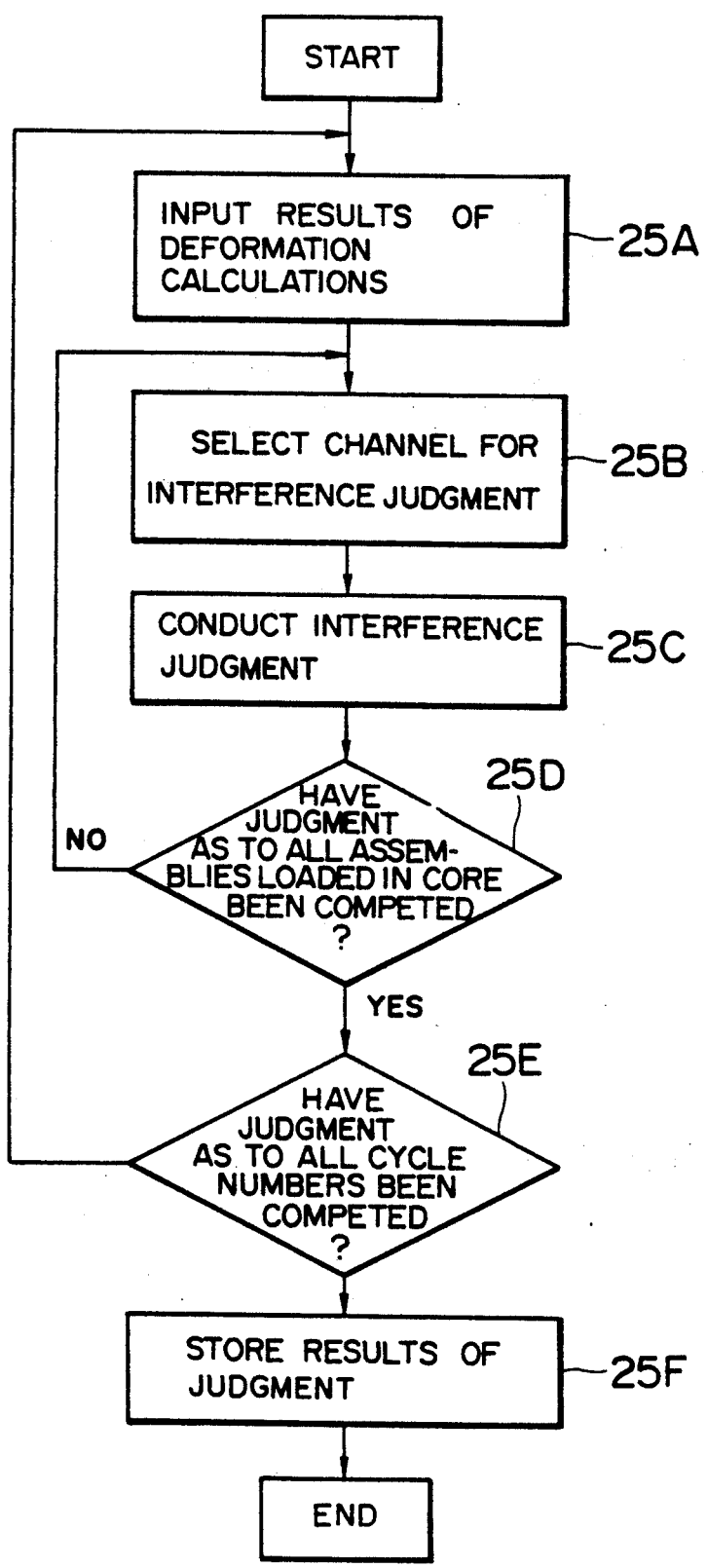

In the flow chart of FIG. 9, the data obtained from the intermediate-data storing section 2c in Step 24 of FIG. 6 that is, the results of the calculations performed on the deformation of the channel boxes of all the loaded fuel assemblies during the set cycle period are read out (Step 25A). Then, channel boxes which are to be subjected to the above interference judgment are selected in a predetermined sequence. This sequence is stored in memory (Step 25B). With respect to all the fuel assemblies loaded in the core, whether or not the control rods interfere with the associated channel boxes is determined (Step 25C).

Figure 24:
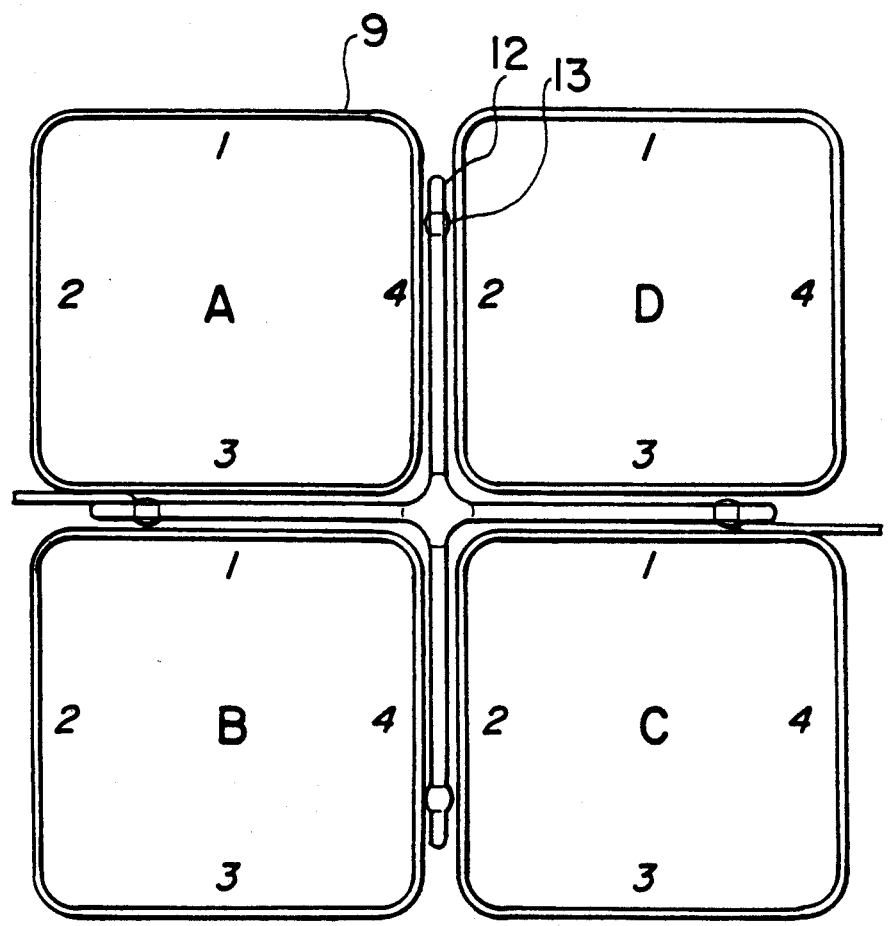
FIG. 24 is a cross-sectional view showing the relationship between the channel boxes and the control rod in one unit assembly within a core.

The above interference judgment is made as to each of the four blades of each cross-shaped control rod in units of cells each consisting of four assembly channel boxes as shown in FIG. 24. FIG. 24 is a cross-sectional view showing the arrangement of the cross-shaped control rod and channel boxes each of which accommodates a fuel assembly. As shown in the figure, each cell unit includes the four channel boxes 9, the control rod 12, control-rod rollers 13, and fuel channel boxes A, B, C and D. If the four fuel assemblies in the cell are represented by A, B, C and D, respectively, and if the inner side surfaces of each of the channel boxes are respectively called a side 1, a side 2, a side 3 and a side 4 in the clockwise direction as viewed in FIG. 24 with the side 1 corresponding to the upper side surface as viewed in this figure, judgment is made as to the interferences between a side A-3 and a side B-1, between a side B-4 and a side C-2, between a side C-1 and a side D-3, between a side C-1 and a side D-3, and between a side D-2 and a side A-4. The interference judgment is made as to each of the areas of the channel box which have been divided in the axial direction thereof.

Figure 25A:
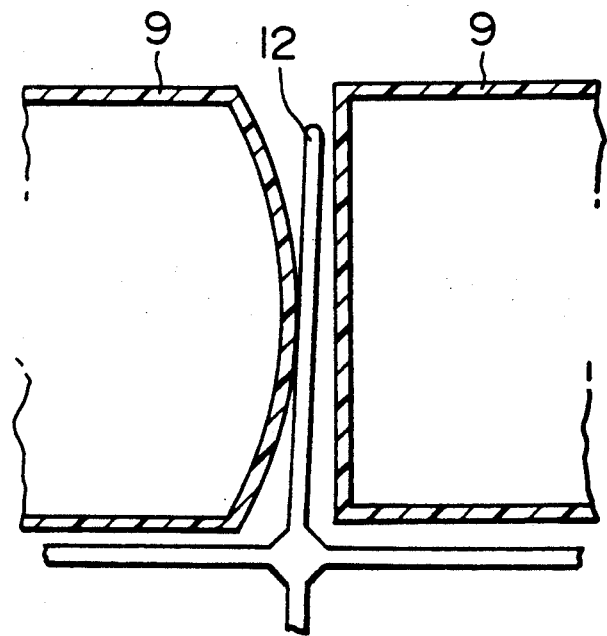
FIGS. 25a and 25b are cross-sectional views showing an interference example between deformed channel boxes and an associated control rod.
Figure 25B:
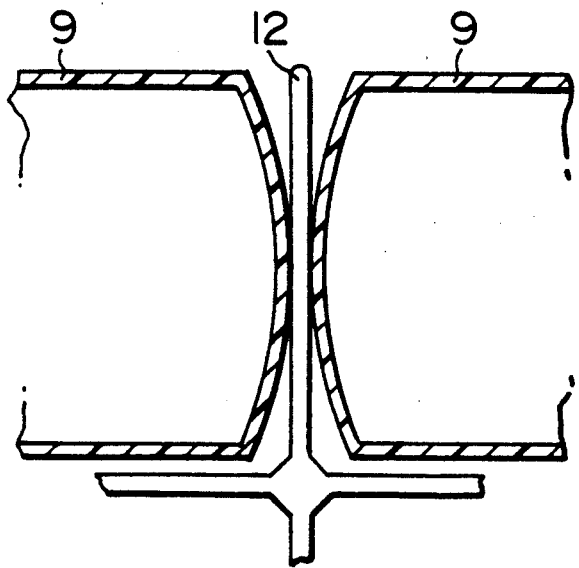

For example, the state shown in FIG. 25a is not regarded as interference, but the state shown in FIG. 25b is regarded as interference.

Referring back to FIG. 9, selection of a channel box which is to be subjected to interference judgment and interference judgment as to the channel box are automatically performed in the computing and processing section 2a (Step 25D).

The above interference judgment is made as to each of the fuel assemblies loaded in the core for all the specified operating cycles (Step 25C). The obtained results of the interference judgement are transferred to and stored in the intermediate-data storing section 2c (Step 25F).

Then, these results of the interference judgment and the results of the associated calculation are displayed in the form of a table or a figure (Step 26 in FIG. 6). FIG.

11 shows in detail the procedure of a displaying portion of the flow chart shown in FIG. 6. In this portion, the results of the interference judgment and the results of the associated calculation are read from the intermediate-data storing section 2c. Subsequently, an operator specifies a display region through the input device 1 in order to determine a position in the core which corresponds to the result to be displayed. When the results of the calculation and the judgment are to be displayed, a particular region in the core can be specified from among the following three regions: 1) a region corresponding to all the channel boxes in the core; 2) a region corresponding to the channel boxes positioned in a specified partial region in the core (½ core or ¼ core); and 3) a region corresponding to an arbitrary single channel box.

Moreover, after a particular display region has been determined, the operator likewise selects and specifies a desired display method through the input device 1. It is possible to select the display method between two kinds of methods: one method utilizes a table, while the other method utilizes a figure. On the basis of information representing these specifications, the computing section 2a creates image data, and this image data is output through the image-data output section dd to the image output device 4 for display purposes.

Figure 15:
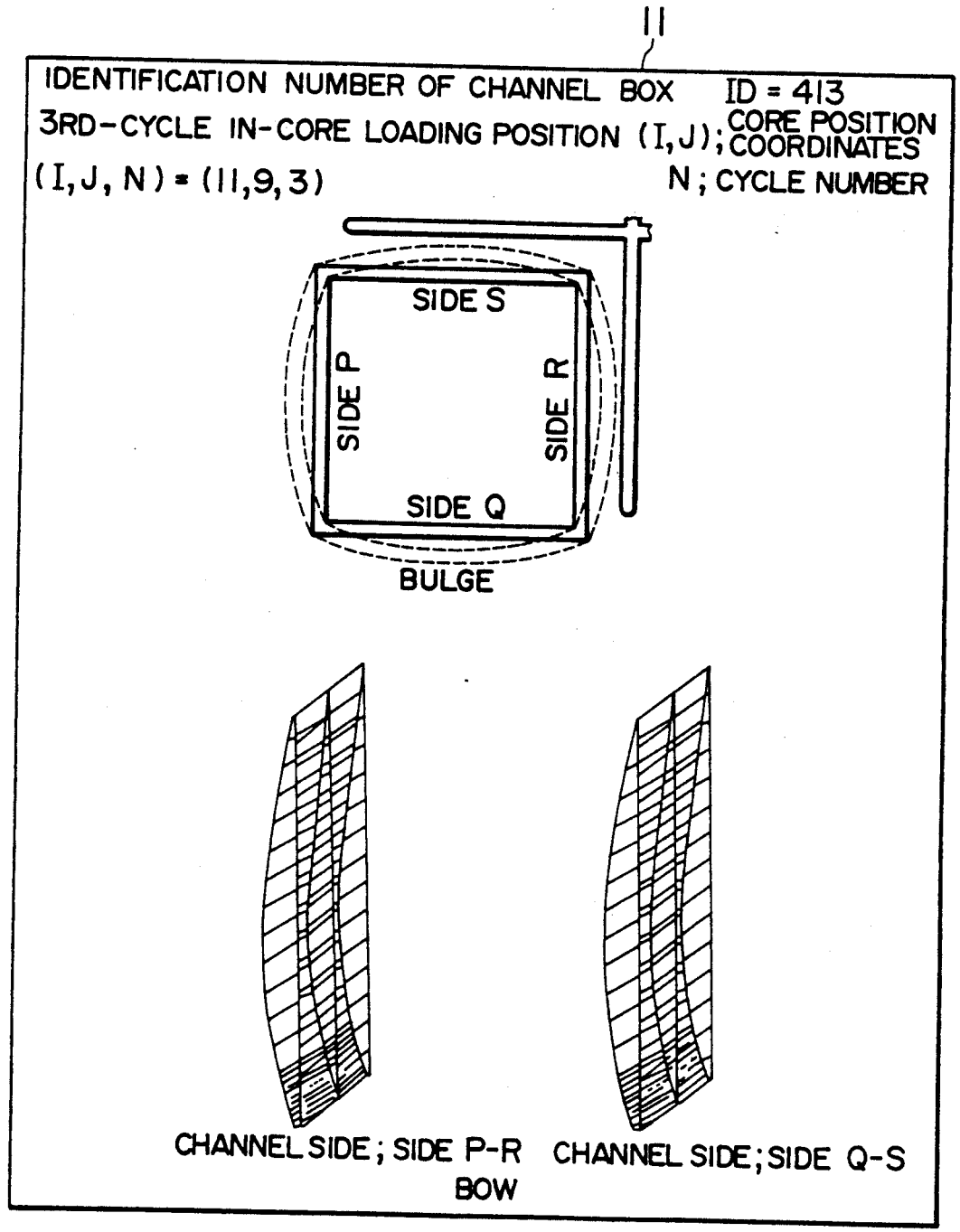
FIG. 15 is a view showing a display example in which the deformations of FIG. 14 are displayed by using figures.

FIG. 14 shows a display example in which the result of judgment is outputted in a table form. FIG. 14 illustrates a display of axial deformations of a particular channel box after the third cycle of exposure has been completed, this channel box being identified with a channel number 413 and core position coordinates (11, 9). In the display output shown in FIG. 14, the status of deformation of one arbitrarily set channel box, and the results of interference judgment as to the same are collectively outputted in a table form. FIG. 15 shows a display example in which the same information is output in the form of a figure. In the display output shown in FIG. 15, the status of deformation of the arbitrary set channel box, namely, bend and bulge are displayed on corresponding figures each of which simulates the channel box.

Figure 17:
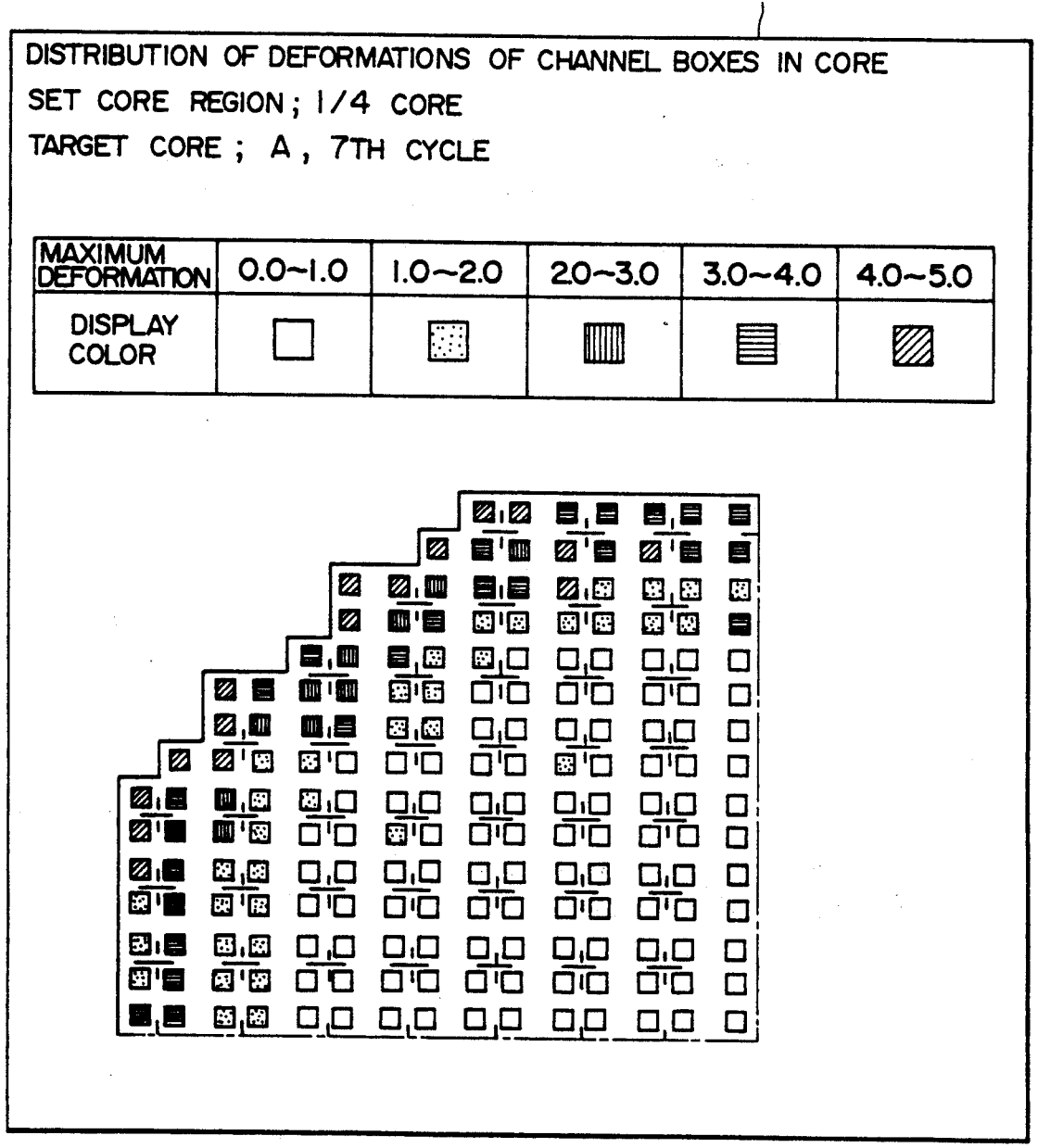
FIG. 17 is a view showing a display example in which the deformations of FIG. 16 are displayed by using figures.
Figure 19:
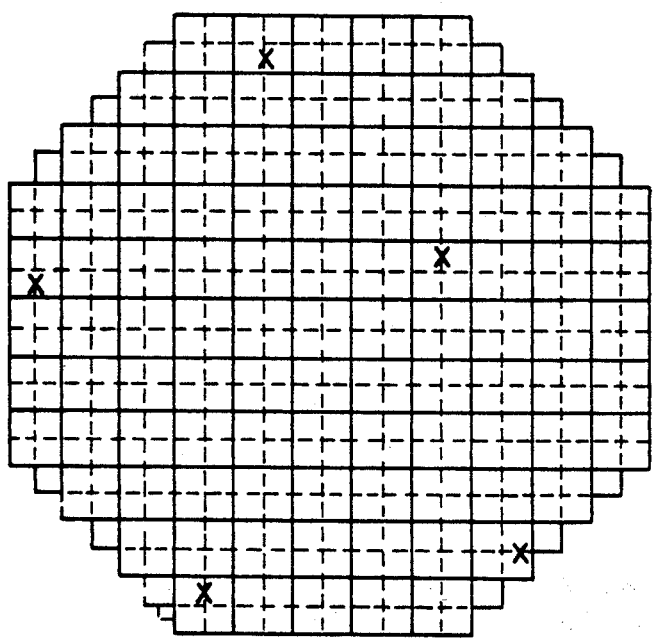
FIG. 19 is a view showing a display example in which the data of FIG. 18 is displayed by using a figure.

FIG. 16 shows a display example of the deformations of a plurality of channel boxes after the seventh cycle has been completed, the channel boxes being located at different positions in a partial region which corresponds to ¼ of the overall region in a core A. In the display output shown in FIG. 16, the statuses of deformations of the respective channel boxes in the partial region which has been set in the core A, loading positions in the core A and the number of exposure cycles are collectively outputted in a table form. FIG. 17 shows a display example in which the same information is outputted in the form of a figure. In the display output shown in FIG. 17, the statuses of deformations of the channel boxes in the partial region (¼ core) which has been set in the core A are represented in different colors each indicating a different degree of maximum deformation, and the thus-colored statuses are displayed on a figure which simulates the partial region in the core A. FIG. 18 shows another display example in which the result of judgment is output in a table form. FIG. 18 is a display example which shows data of particular channel boxes, located at five positions at which interference has occurred, from among all the channel boxes in the core A which have passed the sixth cycle. In the display output shown in FIG. 18, the statuses of deformations of the channel boxes which have interfered with associated control rods from among all the channel boxes in the core A, the loading positions of the channel boxes in question and the number of exposure cycles are collectively outputted in a table form. FIG. 19 shows a display example in which the same information is outputted in the form of a figure. In the display output shown in FIG. 19, the positions of the channel boxes which have interfered with associated control rods from among all the channel boxes in the core A are displayed on a figure which simulates the entire region of the core A.

In the entire procedure, if no interference occurs between any channel box and the associated control rod in the set core region and during the set cycle period as shown in FIG. 6, the process is completed. On the other hand, if interference occurs between a particular channel box and the associated control rod, the core loading position at which it is estimated that the channel box in question does not interfere with the associated control rod, a shuffling pattern and a loading direction are reset (Step 28 in FIG. 6).

Figure 10:
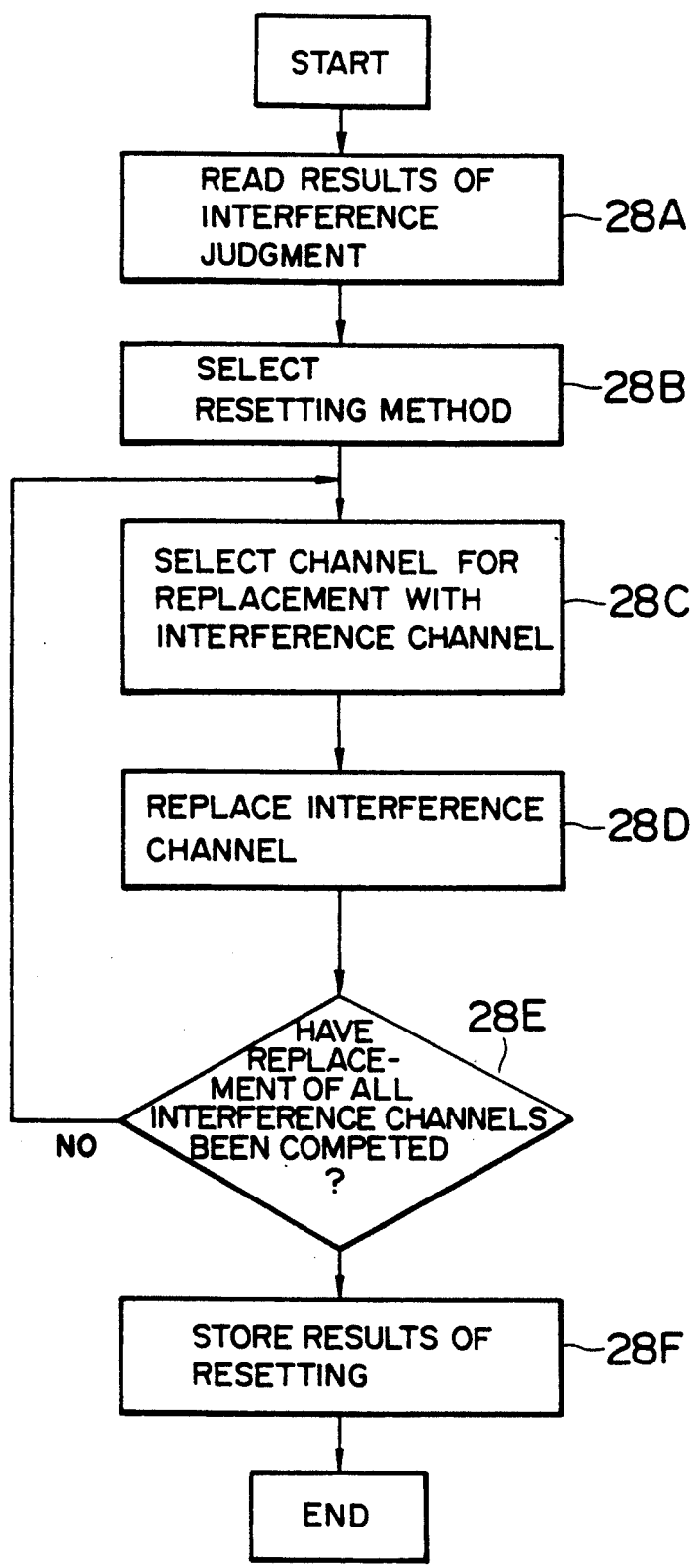
Figure 11:
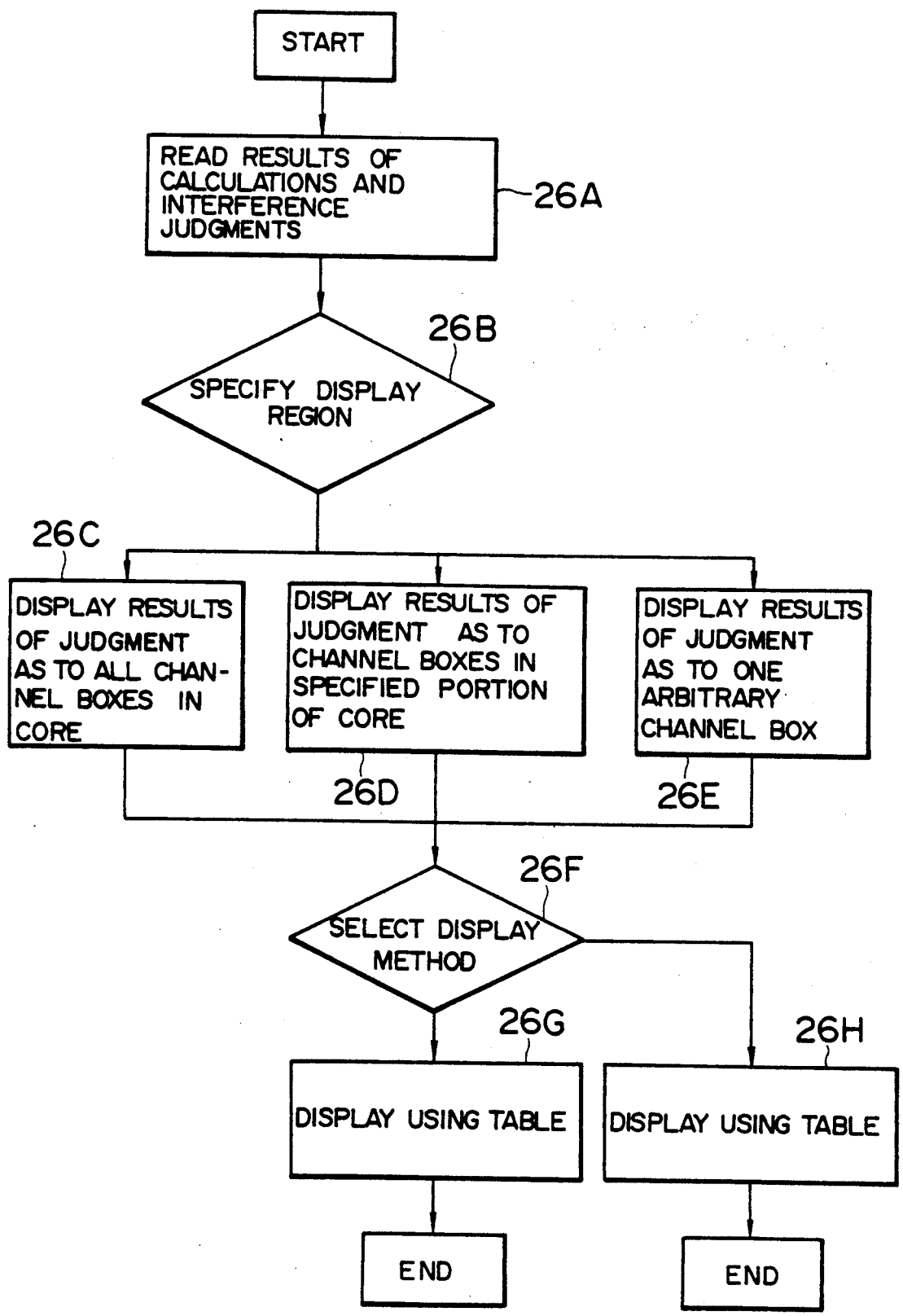

FIG. 10 shows a subroutine for this resetting. First of all, the results of interference judgment obtained in Step 25 of FIG. 6 are read from the intermediate-data storing section 2c (Step 28A). A loading pattern according to which the fuel-assembly channel boxes which have caused interference are to be moved is reset (Step 28B). Several resetting methods are prepared so that the operator can select a desired method on a display screen. For example, information such as that shown in FIG. 21 is displayed on the screen of the display device 4. The operator selects the required rule while viewing the display screen. The selected rule is inputted to the computing section 2a through the input device 3.

Typical examples of the rules are as follows: (1) a rule that channel boxes which have caused interference are moved to the positions of interchangeable assemblies which have been used for exposure in the same exposure cycle; (2) a rule that two side surfaces which oppose an associated control rod are not altered in position in each cell; (3) a rule that a channel box in question is moved to a position in the core and a position in a cell so that a side surface, which bow in a protrusive manner from the first cycle through an $(n-1)$th cycle which preceded an $n^{th}$ cycle in which interference occurred, is made to face outwardly of the core in the $n^{th}$ cycle; and (4) a rule that a channel box in question is moved to the position in a cell at which the direction of bowing occurring during the exposure time of the $n^{th}$ cycle is a direction away from an associated control rod.

Then, a channel box which satisfies the rule selected by the operator is automatically selected from among all the channel boxes by the computing and processing section 2a (Step 28C). At this time, a plurality of interchangeable channel boxes which can satisfy the selected rule are present and a single channel box is therefore selected from among them. In this selection, the computing and processing section 2a may automatically select the required rule, or the operator may select the desired rule while viewing a guidance displayed on the display screen.

In the case of automatic selection by the computing and processing section 2a, a channel box whose deformation occurring from the first cycle through the $(n-1)$th cycle is at a minimum is selected from among the channel boxes which satisfy a specified rule.

In the case of manual selection by an operator, the display device is caused to display a guidance which informs the operator of the positions in the core at which channel boxes, which satisfy the specified rules, are loaded, and the operator selects the desired channel box on the basis of the guidance.

Figure 20:
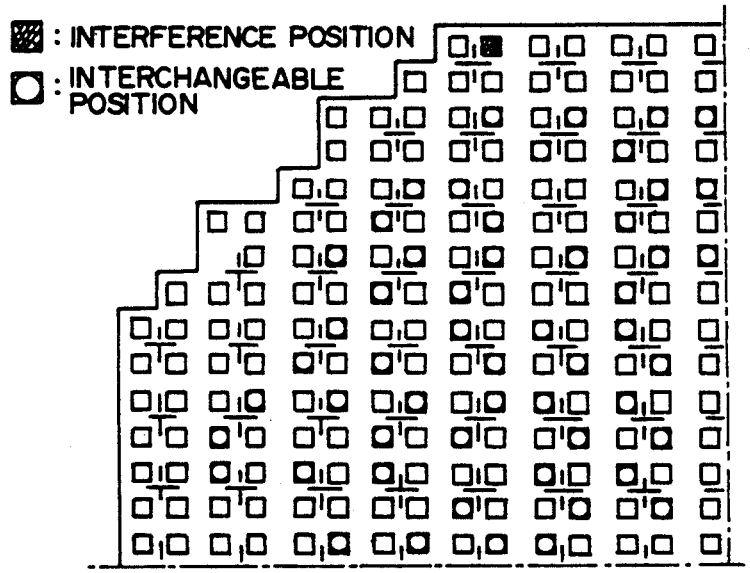
FIG. 20 is a view showing a display example of a guidance used for resetting loading patterns.

In one typical guidance method, on the basis of set rules, a target core position which conforms to each of the rules and core positions which satisfy all the rules are displayed. FIG. 20 shows a display example of the guidance. FIG. 20 is a display example obtained by specifying the core A and a ¼ core region, and shows the position of a channel box which caused interference after the third cycle as well as interchangeable positions. In this embodiment, on the basis of these guidances, the operator selects another channel box to be substituted for a channel box which has caused interference, so as to realize an optimum loading pattern. Data of the thus-selected channel box is inputted through the input device 3 to the computing and processing section 2a. Thereafter, the channel box selected in Step 28C is substituted for the channel box which has caused interference (Step 28D). Thus, the selected channel box which has been loaded in the position of the channel box which made interference is loaded in the position of the channel box which suffered interference.

The above operations are repeated for all the channel boxes which have caused interference (Step 28E). When the positions to which all the channel boxes that have made interference are to be moved are found, the result of this resetting is transferred to and stored in the intermediate-data storing section 2c (Step 28F).

Figure 22:
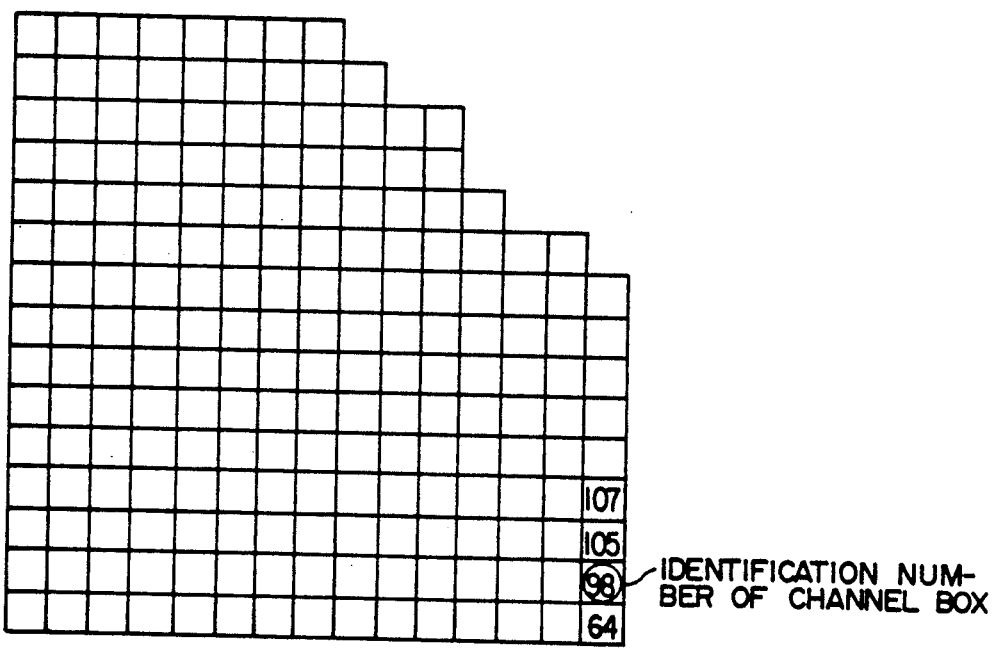
FIG. 22 is a view showing a display example in which the rules of FIG. 21 are displayed by using a figure.
Figure 23A:
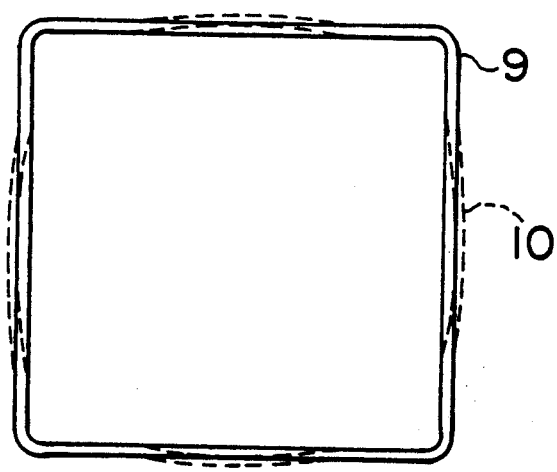
FIG. 23a is a cross-sectional view of a deformed channel box.
Figure 23B:
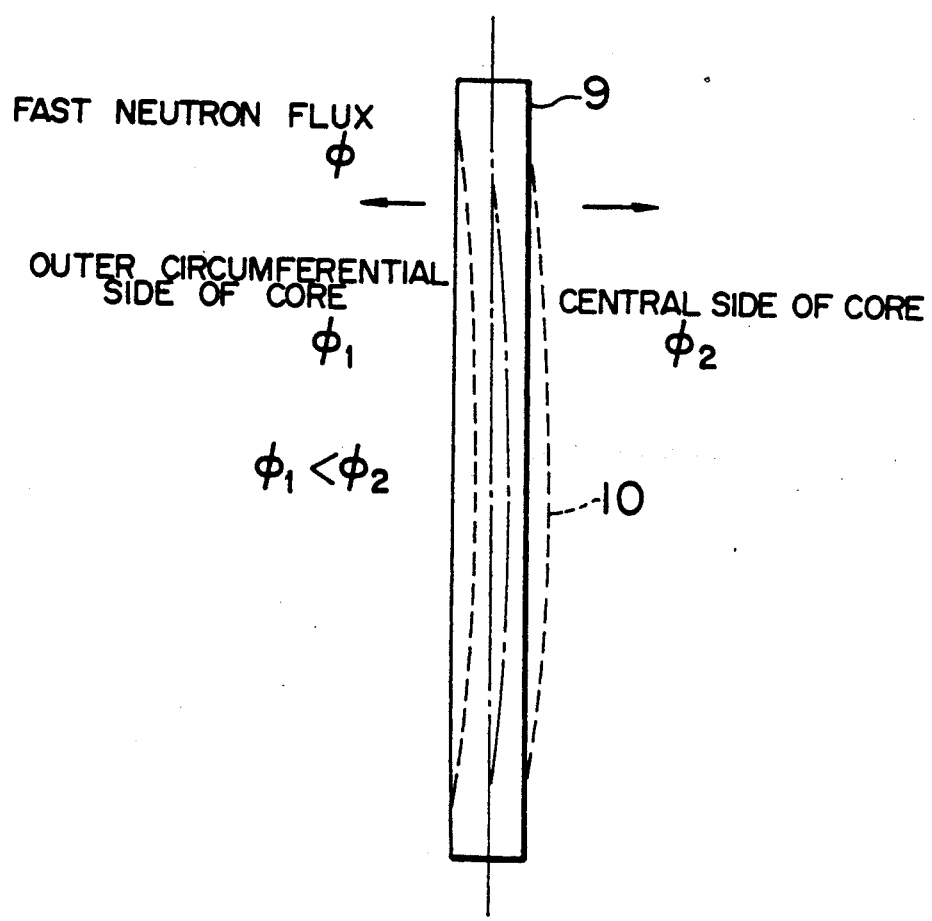
FIG. 23b is a longitudinal sectional view of the deformed channel box.

The loading pattern obtained by such resetting is displayed on the display screen and, at the same time, is stored in the intermediate-data storing device 2c. FIG. 22 shows an example of the display. FIG. 22 shows a display example in which channel boxes in the core A have been reset in accordance with certain rules. When the processing in Step 28 of FIG. 6 is completed, Steps 24, 25 and 28 in FIG. 6 are repeated on the basis of a method of using the reset channel boxes, thereby maximizing the number of channel boxes which do not interfere with associated control rods throughout a set exposure period.

If it is judged here that no matter how the loading position of the channel box which has been used for exposure is set in the reactor, interference with an associated control rod will occur during an exposure period, a display which indicates that the channel box cannot be used is provided on the display screen and, in addition, detailed information such as the shuffling pattern, the loading direction and the operating hysteresis of the channel box in question is displayed on the display screen.

As described above, in the above-described embodiment, in the step of resetting a loading pattern on the basis of the results of judgment as to interference between a channel box and an associated control rod, a guidance for a loading pattern which causes no interference is displayed on the display screen, the guidance being based on previously set restricting conditions and rules. An operator determines an optimum loading pattern while viewing the guidance. However, in the process of resetting a loading pattern, the resetting pattern may be stored in the memory device 8 so that it can be automatically selected.

Figure 26:
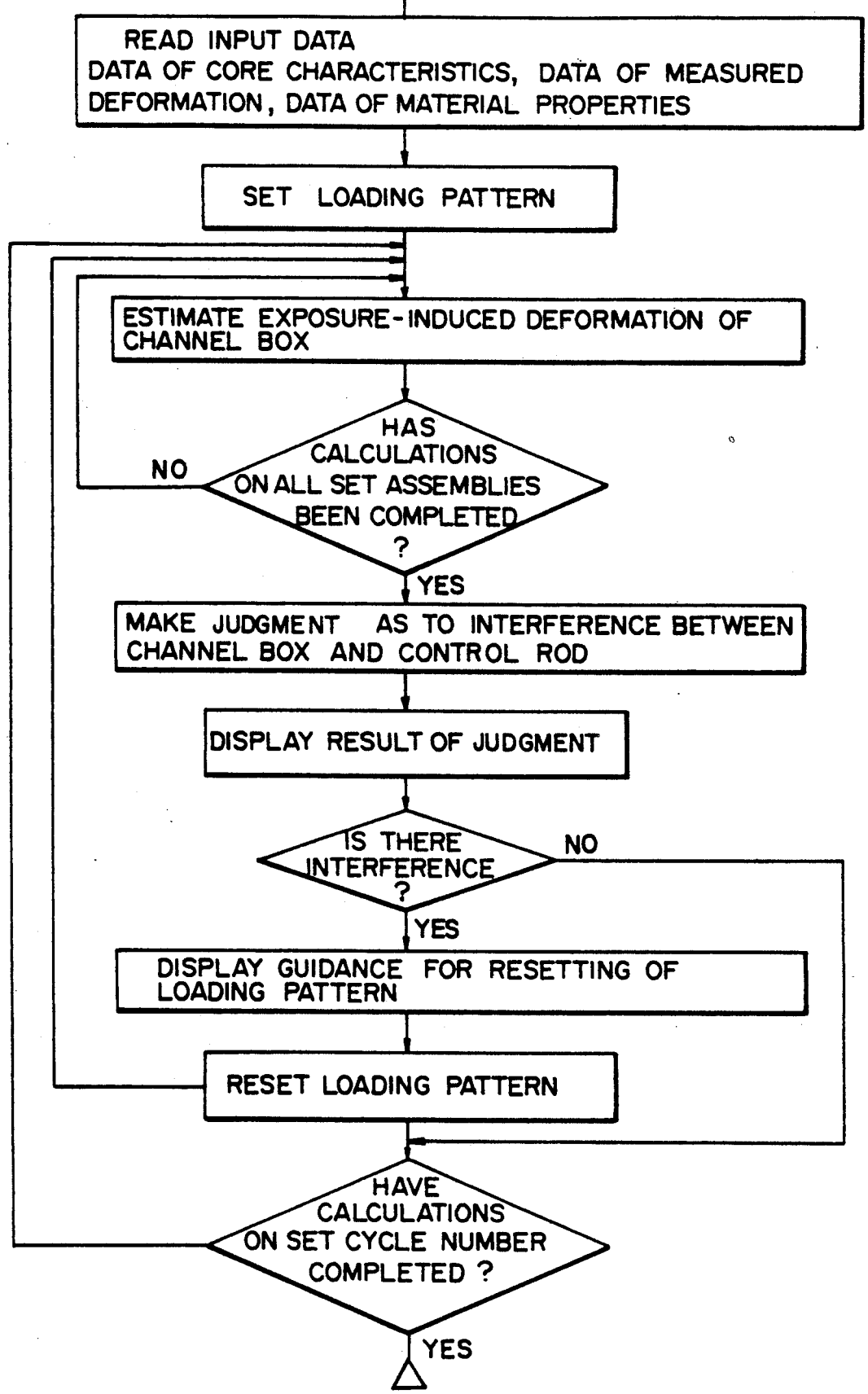
FIG. 26 is a flow chart showing another embodiment of the present invention.

As another embodiment, a procedure such as that shown in FIG. 26 is available. The contents of processing carried out in each step are substantially the same as the contents of processing executed in the aforesaid embodiment. However, by repeating Steps 23, 24, 25 and 26 in FIG. 6 with respect to all the channel boxes loaded in a core in each cycle throughout the loading period thereof, it is possible to set the loading patterns of all the channel boxes for each cycle.

As described above, in the above-described embodiment, in the step of resetting a loading pattern on the basis of the results of judgment as to interference between a channel box and an associated control rod, a guidance for a loading pattern which causes no interference is displayed on the display screen, the guidance being based on previously set restricting conditions and rules. An operator determines an optimum loading pattern while viewing the guidance. However, in the process of resetting a loading pattern, the resetting pattern may be stored in the memory device 8 so that it can be automatically selected.

The use of a method of and an apparatus for evaluating deformations of channel boxes in accordance with the present invention makes it possible to precisely estimate deformations of channel boxes during their loading period in a reactor and, on the basis of the result of this estimation, judgment is made as to whether each channel box has interfered with an associated control rod or not. If interference is estimated to occur, the loading positions, the shuffling pattern, and the loading directions of the channel boxes in question are reset so as to prevent interference. In this manner, it is possible to maximize, while insuring safety, the number of channel boxes which can be used even when the loading period in the reactor is extended. Accordingly, it is possible to reduce the fuel cycle cost and the number of waste channel boxes. It is, therefore, possible to suppress an increase in the space required to store the waste channel boxes.

Briefly stated, in accordance with the present invention, it is possible to provide a method of and an apparatus for evaluating deformations of channel boxes, both of which make it possible to readily judge whether or not interference has occurred between each channel box and an associated control rod during the loading period in a reactor. With the method and apparatus described above, it is possible to select and set a channel-box using method in which the number of channel boxes which do not interfere with associated control rods can be maximized.

What we claim is:

1. A method of evaluating deformations of a channel box of a fuel assembly having been used for exposure in a nuclear reactor core having an array of fuel assemblies, comprising the steps of:
    finding initial deformations of said channel box which has been deformed during past exposure;
    specifying a position in said array at which said channel box is adapted to be located;
    calculating estimated deformations of said channel box during a next exposure cycle from data of core characteristics, data of shape and material properties of channel boxes, data of loading patterns, and said initial deformations; and
    judging whether said calculated deformations are agreeable or not.

2. A method as set forth in claim 1, wherein said estimated deformations are calculated for every channel box in said nuclear reactor core.

3. A method as set forth in claim 2, wherein control rods are provided in said nuclear reactor core, each of said control rods being associated with channel boxes in one group unit, with said judging step determining whether or not any one of said channel boxes in one group unit interferes with the associated control rod due to said estimated deformations.

4. A method of evaluating deformations of channel boxes of fuel assemblies having been used for exposure in a nuclear reactor core, said fuel assemblies being divided in groups each having a predetermined number of said fuel assemblies and including a control rod, comprising the steps of: finding initial deformations of said channel boxes; reading data of core characteristics, data of material properties and shapes of said channel boxes, data of positions of said channel boxes and said control rods, data of loading patterns and said initial deformations; calculating estimated deformations of channel boxes in a next exposure cycle from said read data; judging whether or not said channel boxes interfere with said associated control rods in accordance with said estimated deformations; displaying results of the interference; resetting loading positions, loading directions and a loading pattern causing no interference, if interference is estimated to occur; and displaying said reset loading positions, directions and pattern.

5. A method as set forth in claim 4, further comprising the steps of maximizing a number of channel boxes which do not interfere with the associated control rods, wherein said maximizing step is carried out in such a way that said calculating step, said judging step and said resetting step are repeated in accordance with said reset loading pattern so as to maximize a number of channel boxes which do not interfere with said associated control rods.

6. A method as set forth in claim 5, wherein said calculating step, said judging step, said resetting step and said maximizing step are repeated so as to set a loading pattern of said channel boxes loaded in said reactor core, with which it is estimated that no interference occurs during said next exposure cycle.

7. A method as set forth in claim 4, wherein said initial deformations are obtained by measuring said channel boxes.

8. A method as set forth in claim 4, wherein said initial deformations of said channel boxes are calculated from said data of core characteristics, said data of material properties and shapes of said channel boxes, said data of loading patterns and data of past exposure applied to said channel boxes.

9. An apparatus for evaluating deformation of channel boxes of fuel assemblies having been used for exposure in a nuclear reactor core; comprising memory means for storing therein data of core characteristics, data of material properties and shapes of said channel boxes, data of initial deformations of said channel boxes, and data of loading patterns; a computing and processing means for calculating estimated deformations of said channel boxes during a next exposure cycle in accordance with said data delivered from said memory means with the use of arithmetic expressions; and a display means for displaying a result of calculation made by said computing and processing means.

10. An apparatus as set forth in claim 9, wherein said nuclear reactor core includes control rods each associated with one unit group of said fuel assemblies having a predetermined number, and said computing and processing means is adapted to judge whether said channel boxes interfere with said associated control rods.

* * * * *